United States Patent
Prabhu et al.

(10) Patent No.: US 11,915,286 B1
(45) Date of Patent: Feb. 27, 2024

(54) SYSTEMS AND METHOD FOR ATTRIBUTING TRANSACTIONS FROM MULTIPLE WEBSITES TO CONTENT PRODUCERS

(71) Applicant: AMAZON TECHNOLOGIES, INC., Seattle, WA (US)

(72) Inventors: Venkatraman Prabhu, Seattle, WA (US); Dave Jonathan Lefkow, Issaquah, WA (US); Anthony Quigley, Seattle, WA (US); Saurav Ray, Scottsdale, AZ (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/546,935

(22) Filed: Dec. 9, 2021

(51) Int. Cl.
    *G06Q 30/0601* (2023.01)
(52) U.S. Cl.
    CPC ..... *G06Q 30/0609* (2013.01); *G06Q 30/0641* (2013.01)
(58) Field of Classification Search
    CPC ............... G06Q 30/0641; G06Q 30/02; G06Q 30/0633; G06Q 30/0643; G06Q 30/0277; G06Q 20/12; G06Q 30/0241; G06Q 30/0623; G06Q 30/0207; G06Q 30/0255
    USPC ................... 705/39, 26.1, 26.62, 27.1, 14.23
    See application file for complete search history.

(56) References Cited

U.S. PATENT DOCUMENTS

| | | | |
|---|---|---|---|
| 9,047,607 B1 | 6/2015 | Curial et al. | |
| 10,169,778 B1 * | 1/2019 | Collin | G06Q 30/0246 |
| 11,210,730 B1 * | 12/2021 | Woodyard | G06Q 20/12 |
| 2002/0111856 A1 * | 8/2002 | Messer | G06Q 30/02 705/14.16 |
| 2017/0200178 A1 * | 7/2017 | Shiffert | G06Q 30/0269 |
| 2020/0250709 A1 * | 8/2020 | Swartz | G06Q 30/0249 |
| 2020/0401949 A1 * | 12/2020 | Dangi | G06N 20/00 |
| 2022/0284474 A1 * | 9/2022 | MacDougall | G06Q 30/0641 |

OTHER PUBLICATIONS

Hongshuang (Alice) Li and P.K. Kannan, Attributing Conversions in a Multichannel Online Marketing Environment: An Empirical Model and a Field Experiment, Feb. 2014, American Marketing Association, Journal of Marketing Research, vol. LI, 40-56 (Year: 2014).*

* cited by examiner

*Primary Examiner* — Marissa Thein
*Assistant Examiner* — Zachary T. Shuckrow
(74) *Attorney, Agent, or Firm* — Lindauer Law, PLLC (57) ABSTRACT

When a user accesses content describing an item able to be purchased using a first website, and the user subsequently purchases the item using a second website within a threshold length of time of the access to the content, the purchase may be inferred to have been induced by the content, even though the content would normally direct the user to the first website. To correlate purchases across different websites, data identifying the user's device or a user account and data identifying the item is acquired when the content is accessed by the user. Subsequently, additional data is acquired when the item is purchased. If the additional data corresponds to the previous data, this may be used to determine that the same user has purchased the same item described by the content that was accessed.

20 Claims, 6 Drawing Sheets

SYSTEMS AND METHOD FOR ATTRIBUTING TRANSACTIONS FROM MULTIPLE WEBSITES TO CONTENT PRODUCERS

BACKGROUND

Merchants that sell items using multiple websites will often engage affiliate marketers or other types of content producers to produce content that is presented to potential customers. The content may include links or other controls to navigate to a merchant website, where an item may be purchased. In cases where a customer accesses the merchant website in this manner, but ultimately purchases the item from a different website, this purchase may not be properly attributed to the content producer, resulting in lost revenue and a diminished incentive for content producers to produce content for the merchant.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Many merchants or other sellers of items will offer one or more items for purchase, lease, rental, subscription, or other types of transactions using multiple online interfaces. For example, a seller may maintain a website that is used to sell one or more items specific to the seller, and may also sell items using an online store that offers items from multiple sellers. Due to the large number of similar and related items that are available, some sellers will engage an affiliate, marketer, influencer, reviewer, advertiser, or other type of content producer, who will present content promoting an item. The content typically includes a link or other type of control, which may be accessed by potential customers, who are then redirected to the merchant website, where a transaction for the promoted item may be initiated. Content producers are typically paid a commission, such as a percentage of item sale revenues associated with users that purchase a promoted item within an agreed length of time after accessing information presented by the content producer. Therefore, if a customer does not purchase an item immediately after accessing the merchant website, but returns to the merchant website to purchase the item at a future time, the content producer is paid a commission if the future time occurs within the agreed length of time after the content was accessed by the customer. However, when a merchant offers a particular item using multiple websites, such as the merchant website as well as a large online store, many customers that initially access an item on a merchant website after viewing the content from the content producer may purchase the content from the online store at a future time. In such a case, the purchase may not be properly attributed to the content producer, even though the content that was presented to the user was the cause of the purchase, resulting in a lost commission for the content producer. The possibility of reduced revenue due to purchases from alternate websites may disincentivize content producers from accepting engagements with sellers that offer items for purchase using multiple websites.

Described in this disclosure are techniques for determining proper attribution of transactions and compensation for content producers when cross-channel purchases of items, or other types of transactions (e.g., leases, rentals, subscriptions) occur. As used herein, an "item" may include a physical good or service, a digital product such as text, audio, or video data, a digital service such as access to digital content or a streaming service, and so forth. A cross-channel purchase may include a purchase where an item is initially viewed using a first website, in response to access to content associated with a content producer, then a transaction for the item is subsequently initiated using a different website. A different website may include a website that is operated by a different entity than the initial website, independent of whether the two websites are associated with the same domain or hosting platform or a different domain or hosting platform, a website that is operated by the same entity but utilizes a different domain or hosting platform, and so forth. Content associated with a content producer may include content that is produced by the content producer, such as a video, blog, review, advertisement, and so forth. Content associated with a content producer may also include content presented or indicated by the content producer. For example, a content producer may present a copy of existing content, a link to existing content, and so forth. In some cases, a content producer may use an at least partially automated system, such as one or more computing devices that may copy or link to existing content having selected characteristics or that may generate content having selected characteristics.

For example, a first webpage associated with a content producer may present information regarding an item, a group of items such as items associated with the same brand or that share another characteristic, or a brand or manufacturer that is associated with one or more items. Continuing the example, the information included in the accessed content may describe an item that is associated with a seller and offered for purchase using a second webpage associated with a first website (e.g., a merchant website associated with the seller). Continuing the example, the first webpage associated with the content producer may include a link or other type of control that may be used to access the second webpage associated with the merchant website, where a transaction for the item may be initiated.

At a first time, a user may select the link presented in the content. In response to selection of the link, data may be acquired that includes an identifier indicative of the content producer or the presented content, an identifier indicative of the item, the merchant, or the merchant website, and an identifier indicative of the computing device or user account that selected the link to access the merchant website. For example, the link may include a uniform resource indicator (URI) that first directs a computing device to a website associated with an online store. The website associated with the online store may acquire data indicative of the content producer, item, and computing device, then redirect the computing device to access the merchant website. In some cases, the URI may include one or more identifiers embedded therein. For example, the URI may include text, such as an alphanumeric string, that functions as an identifier for one or more of the content producer, the content, the item, the merchant, or the merchant website. In some implementations, data may be stored on the computing device used to access the content and merchant website. For example, one or more of a first party cookie associated with the online store or a first party cookie associated with the merchant website may be stored in association with the computing device. The data stored on the computing device may be indicative of one or more of the identifiers described previously.

If the user does not initiate a transaction for the item using the merchant website, but subsequently purchases the item using the online store, the acquired identifiers, and in some cases the data stored in association with the computing device, may be used to associate the transaction with the content producer. For example, at a second time, the user may access a third webpage associated with the online store and may initiate a transaction for the item. In response to initiation of a transaction for the item, additional data may be acquired that includes the identifier for the item, merchant, or merchant website, and the identifier for the computing device or user account associated with the user. This additional data may be compared with the previous data acquired when the merchant website was accessed using the content associated with the content producer. In some cases, this additional data may also be compared with data that was stored on the computing device when the merchant website was accessed. Based on correspondence between the additional data and the previously-acquired data, an association between the transaction and the content presented by the content producer may be generated. Based on this association, the content producer may receive a commission, incentive, or other type of remuneration if the transaction occurred within a threshold length of time after the content was initially accessed by the user. For example, data generated that indicates the association between the transaction and the content may indicate a commission value, a commission rate, or other type of incentive.

In some implementations, transactions for one or more related items may be attributed to a content producer. For example, a user accessing content presented by a content producer may select a link or other control within the content to access a webpage of a merchant website. At a subsequent time, the user may access an online store, but rather than purchasing the item viewed using the merchant website, the user may ultimately initiate a transaction for a related item, such as a variant of the item associated with the same brand or manufacturer. In cases where the related item is also offered by the same seller as the initial item, in response to correspondence between the additional data acquired from the computing device associated with the user at the time of purchase, and the previously-acquired data, an association between the transaction for the related item and the content presented by the content producer may be generated to cause transfer of remuneration to the content producer. In some cases, a commission rate or other incentive associated with purchase of a related item may differ from the commission rate or incentive associated with purchase of the item presented in the content. In some implementations, if a user initiates a transaction for a related item that is not associated with the seller of the initial item, the online store may determine an association between the transaction and the content presented by the content producer, and in some cases, may cause transfer of remuneration to the content producer.

In some implementations, a seller may be provided with output indicative of transactions that may be attributed to content from one or more content producers, and the websites that were used to initiate the transactions. For example, output data may be generated that indicates a first count of transactions for an item that were initiated using the merchant website after navigating to the merchant website using content from a content producer, and a second count of transactions for the item that were initiated using the online store after previously accessing the merchant website using the content from the content producer. Based on this data, a seller may compare the effectiveness of particular content at incentivizing purchases using the merchant website and the online store. The seller may also compare the effectiveness of the merchant website and online store for inducing or facilitating transactions for an item. In some implementations, the output data may be determined based in part on purchase history data and other transaction or interaction data associated with the online store. For example, based on purchase history data, previous items associated with the seller or that are related to a purchased item may be determined. Continuing the example, an output may indicate whether a user has previously purchased items associated with the seller, or whether the user is a new customer that has not previously purchased items associated with the seller. In some cases, a commission rate or incentive offered to a content producer for a transaction associated with a new customer may differ from a commission rate or incentive offered for a transaction associated with another customer.

Implementations within the present disclosure may therefore enable a user to be directed to a first website, such as a merchant website, using content produced by a content producer that promotes an item, seller, brand, or characteristic of the item. The user may then later initiate a transaction for the item using a second website, and may be recognized at the later time so that the transaction may be properly attributed to the content that was initially accessed by the user. For example, when a user navigates to the first website, such as by selecting a link within the content presented by the content producer, identifiers indicative of the content, content producer, item, merchant website, merchant, user device, or combinations thereof may be determined, such as through embedding of the identifiers within the URI of the link or directing the user to a website associated with the online store to enable such information to be acquired prior to redirecting the user to the merchant website. As a result, purchases and other transactions that are caused by content presented by a content producer may be properly attributed to the content producer, even in cases where a user ultimately initiates a transaction for an item using a website other than the website accessed using the content. Content producers are thereby provided with appropriate commissions and other incentives while avoiding a disincentive for content producers to accept engagements with sellers that offer items using multiple websites. Additionally, by determining data indicative of purchases and other transactions across multiple websites, sellers may be provided with output indicating transactions associated with different websites and characteristics of users that initiate transactions, such as whether a user has previously purchased similar items or other items from the seller.

Figure 1A:
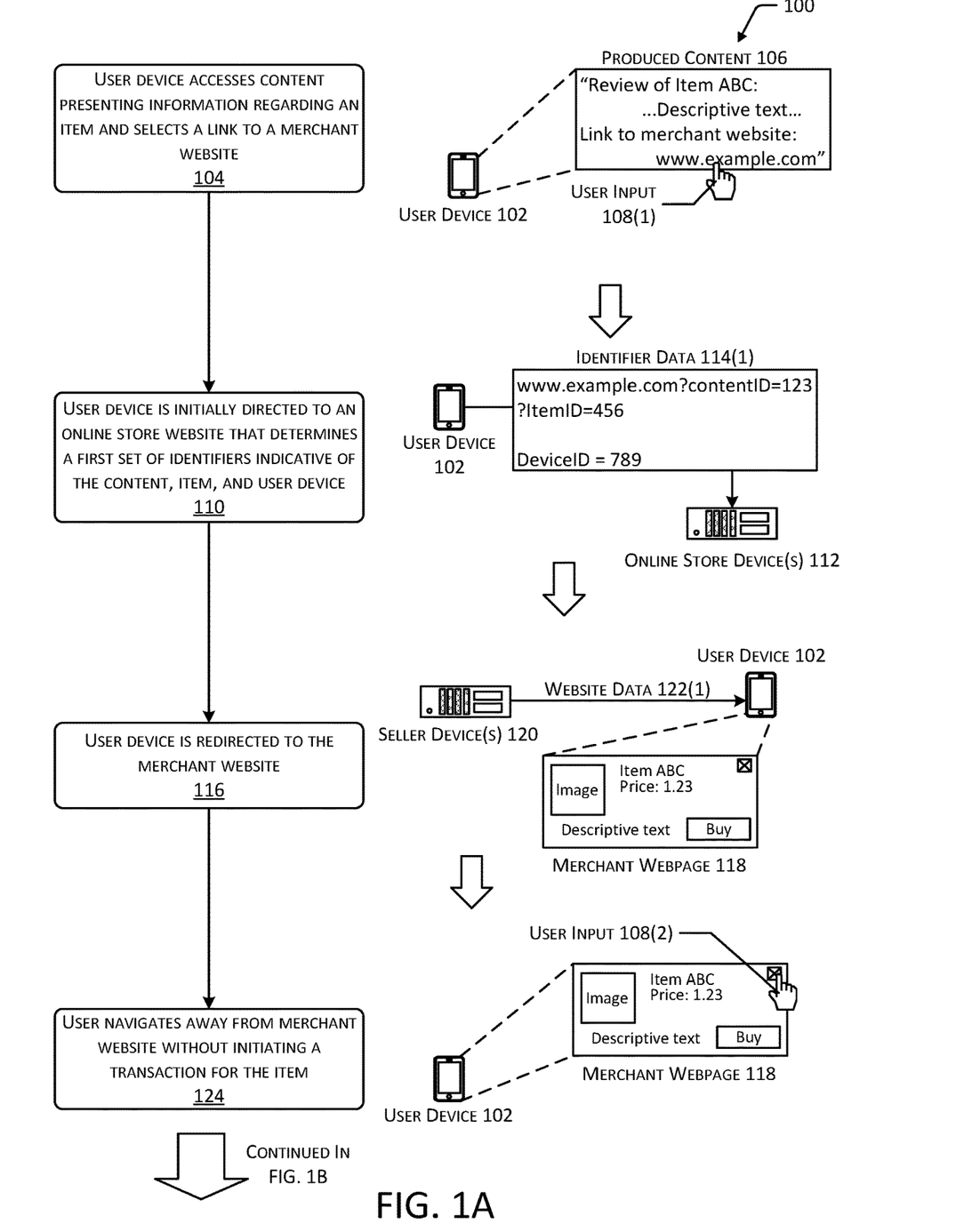
FIGS. 1A and 1B are diagrams depicting an implementation of a process for determining data indicative of access by a user device to a first website associated with an item, then determining a subsequent purchase of the item, that is associated with the user device, from a second website.
Figure 1B:
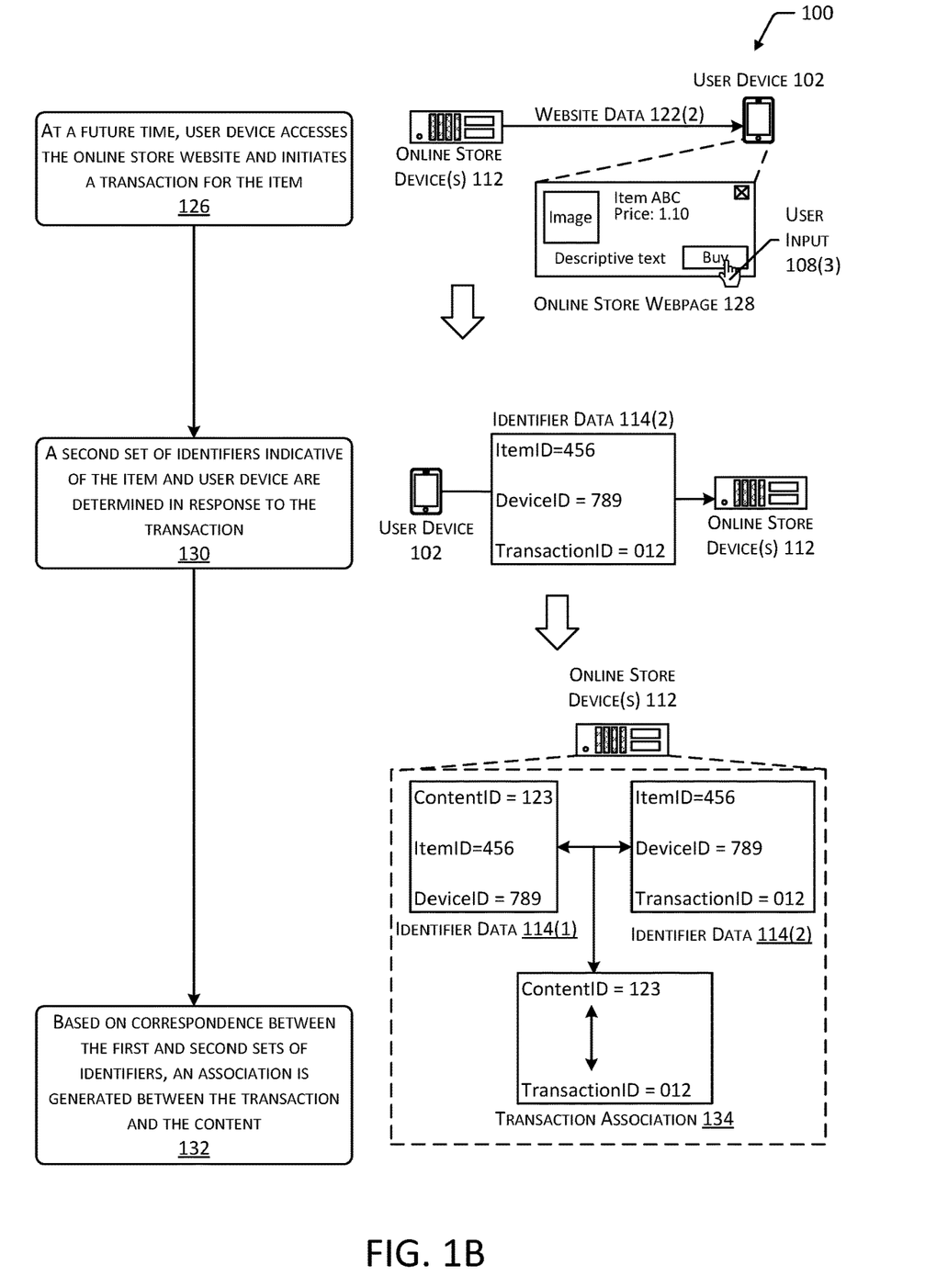

FIGS. 1A and 1B are diagrams 100 depicting an implementation of a process for determining data indicative of access by a user device 102 to a first website associated with an item, then determining a subsequent purchase of the item, that is associated with the user device 102, from a second website. At block 104, a user device 102 may access content that presents information regarding one or more items, merchants, brands, or characteristics of the item(s), then select a link to a merchant website that is within the content. For example, the user device 102 may include a computing device that is usable to access a website associated with one or more content producers that present produced content 106 indicative of one or more items 102. A content producer may include an entity that generates content, or provides links or other controls to access existing content, that is associated with a particular item or group of items (such as items associated with a particular brand, seller, or other characteristic). Content associated with the content producer may be generated or indicated by human users or by at least partially automated computing devices. Continuing the example, the produced content 106 may include a blog, review, video, images, or other content that is descriptive of characteristics of an item 102, which may be presented with the intent to encourage one or more users to purchase, rent, lease, or enter into a subscription for the item 102. In other cases, the produced content 106 may include copies of or links to existing content, such as a link to an existing review, electronic publication, description, or other information associated with an item. The produced content 106 may include one or more links or other types of controls which may be used to initiate a transaction for the item 102 or navigate to a merchant website where a transaction for the item 102 may be initiated or additional information regarding the item 102 may be accessed. For example, the user device 102 may be used to provide user input 108(1), such as input to a touch sensor, mouse device, keyboard, or other type of input device, to select the link or control to cause a browser application or other type of application associated with the user device 102 to access the merchant website. While FIG. 1A depicts the user device 102 as a smartphone, in other implementations, the user device 102 may include any number and any type of computing device(s) including, without limitation, a personal computing device, portable computing device, wearable computing device, server, vehicle-based computing device, media device, gaming controller, remote control device, set top box, networked speaker device, and so forth.

At block 110, in response to the user input 108(1) selecting the link to the merchant website, the user device 102 may initially be directed to a website associated with an online store which may determine a first set of identifiers indicative of the content, the item, and the user device 102. For example, the link or other type of control included in the produced content 106 may initially cause a browser application or other type of application associated with the user device 102 to access one or more online store devices 112. The online store devices 112 may be associated with an online store website from which one or more items, including the item presented in the produced content 106, are available. Based on the access by the user device 102 to the link, the online store device(s) 112 may determine identifier data 114(1) that includes identifiers indicative of the produced content 106, the item, and the user device 102. For example, the link included in the produced content 106 may include one or more embedded identifiers, such as text strings indicative of the produced content 106, the item, or both the produced content 106 and the item 102. In other implementations, identifiers indicative of one or more of the produced content 106 or the item may be determined based on data associated with the user device 102. One or more device identifiers indicative of the user device 102 or a user account associated with the user device 102 may also be determined. For example, a device identifier may be determined based on one or more hardware or software components of the user device 102, a network address associated with the user device 102, and so forth. While FIG. 1A depicts the online store device(s) 112 as a server, in other implementations, the online store device(s) 112 may include any number and any type of computing device(s) including, without limitation, the types of computing devices described with regard to the user device 102. Additionally, while FIG. 1A depicts the identifier data 114(1) including identifiers indicative of the produced content 106, the item, and the user device 102, in other implementations, the determined identifiers may be indicative of one or more of the content producer, the merchant, the merchant website, or a user account associated with the user device 102. For example, a content producer may be associated with an identifier, and multiple bodies of produced content 106 produced by the content producer may be associated with this identifier.

At block 116, the user device 102 may be redirected to the merchant website. For example, while the link included within the produced content 106 may initially cause the user device 102 to access the online store device(s) 112, the link may function as a redirection link that ultimately directs the user device 102 to access a merchant webpage 118 that presents information regarding the item indicated in the produced content 106. For example, in response to the user input 108(1) selecting the link, one or more seller devices 120 associated with the merchant website may provide website data 122(1) indicative of the merchant webpage 118 to the user device 102. The user device 102 may present at least a portion of the merchant webpage 118 using one or more output devices, such as display devices, speakers, and so forth. The merchant webpage 118 may include information regarding the item, such as images, descriptive text, item names or titles, a price associated with the item, one or more controls to initiate a transaction associated with the item, and so forth. While FIG. 1A depicts the seller device(s) 120 as a server, in other implementations, the seller device(s) 120 may include any number and any type of computing device(s) including, without limitation, the types of computing devices described with regard to the user device 102 and online store device(s) 112.

In some cases, a user may not necessarily initiate a transaction for the item after accessing the merchant webpage 118. For example, at block 124, a user may navigate away from a merchant website without initiating a transaction for the item. As shown in FIG. 1A, user input 108(2) may be provided to a control presented in the merchant webpage 118 to cease accessing the merchant webpage 118 or navigate away from the merchant webpage 118. In such a case, the identifier data 114(1) may be retained in association with the online store device(s) 112 and used to determine whether the user subsequently initiates a transaction for the item using the online store website.

As shown in FIG. 1B, at block 126, at a future time, the user device 102 may access the online store website, and may initiate a transaction for the item using the online store website. For example, the online store may offer the same item available using the merchant webpage 118. The user device 102 may access the online store website and provide input to access information regarding the item, such as a search query, selection of particular links, and so forth. In response to the access by the user device 102, the online store device(s) 112 may provide website data 122(2) to the user device 102 to cause presentation of an online store webpage 128 that includes information indicative of the item. The online store webpage 128 may include one or more controls to initiate a transaction for the item. In response to user input 108(3) to one or more of the control(s), a transaction for the item, such as a transaction to purchase, lease, rent, or subscribe for the item, may be initiated. For example, the online store website may include controls for selection or input of payment options, shipping options, and so forth to cause acquisition of the item by a user associated with the user device 102.

At block 130, in response to the transaction for the item, a second set of identifiers indicative of the item and the user device 102 may be determined. For example, identifier data 114(2) indicative of an identifier for the item, an identifier for the user device 102 or user account, and an identifier for the transaction may be determined by the online store device(s) 112 in response to initiation of the transaction. In some cases, at least a portion of the identifier data 114(2) may be determined based on the user device 102, such as by determining a hardware or software component of the user device 102, a network address of the user device 102, or another characteristic of the user device 102. In some cases, at least a portion of the identifier data 114(2) may be determined based on data stored in association with the online store device(s) 112. For example, the online store device(s) 112 may store item data indicative of characteristics of items, which may include an item identifier. As another example, the online store device(s) 112 may generate or determine a transaction identifier when a transaction associated with an item is initiated.

At block 132, based on correspondence between the first and second sets of identifiers, an association may be generated between the transaction and the content that was initially accessed by the user device 102. For example, a user device 102 may initially access produced content 106 associated with a content identifier. The produced content 106 may be associated with an item having an item identifier. The user device 102 may access a merchant webpage 118 using a link or other control included within the produced content 106, and a device identifier indicative of the user device 102 may be determined. At a subsequent time, the user device 102 may access an online store and may initiate a transaction for the item. Therefore, the first identifier data 114(1) and the second identifier data 114(2) may include corresponding identifiers for the item for which a transaction was initiated. Additionally, the first identifier data 114(1) and the second identifier data 114(2) may include corresponding identifiers for the user device 102. Based on correspondence between the first identifier data 114(1) and the second identifier data 114(2), the transaction that was initiated by the user device 102 may be attributed to the content producer associated with the produced content 106. For example, although the user associated with the user device 102 did not initiate the transaction for the item using the merchant website, the subsequent transaction may be inferred to have been encouraged by the user's access to the produced content 106. Therefore, the online store device(s) 112 may determine a transaction association 134 between the identifier for the content or the content producer and the identifier for the transaction. The transaction association 134 may be used to cause transfer of a commission, incentive, remuneration, and so forth to a content producer associated with the produced content 106. Compensation provided to a content producer may include one or more of currency, virtual or cryptocurrency, goods or services such as items offered by a seller, and so forth. In some cases, points, tokens, credits, or other representations of attributed transaction may be provided by a merchant website or online store, which may be exchanged by a content producer for other forms of compensation. While FIGS. 1A and 1B depict an example in which a user device 102 is used to purchase the same item using an online store webpage 128 that was previously viewed using a merchant webpage 118, in other implementations, a user may purchase an item that is similar to, related to, or complementary to the item presented on the merchant webpage 118. In such a case, the online store device(s) 112 may determine a relationship between the item that was purchased and the item that was presented in the merchant webpage 118, and in response to the relationship and the correspondence between the identifiers indicative of the user device 102, an association between the transaction and the produced content 106 may be determined.

Figure 2A:
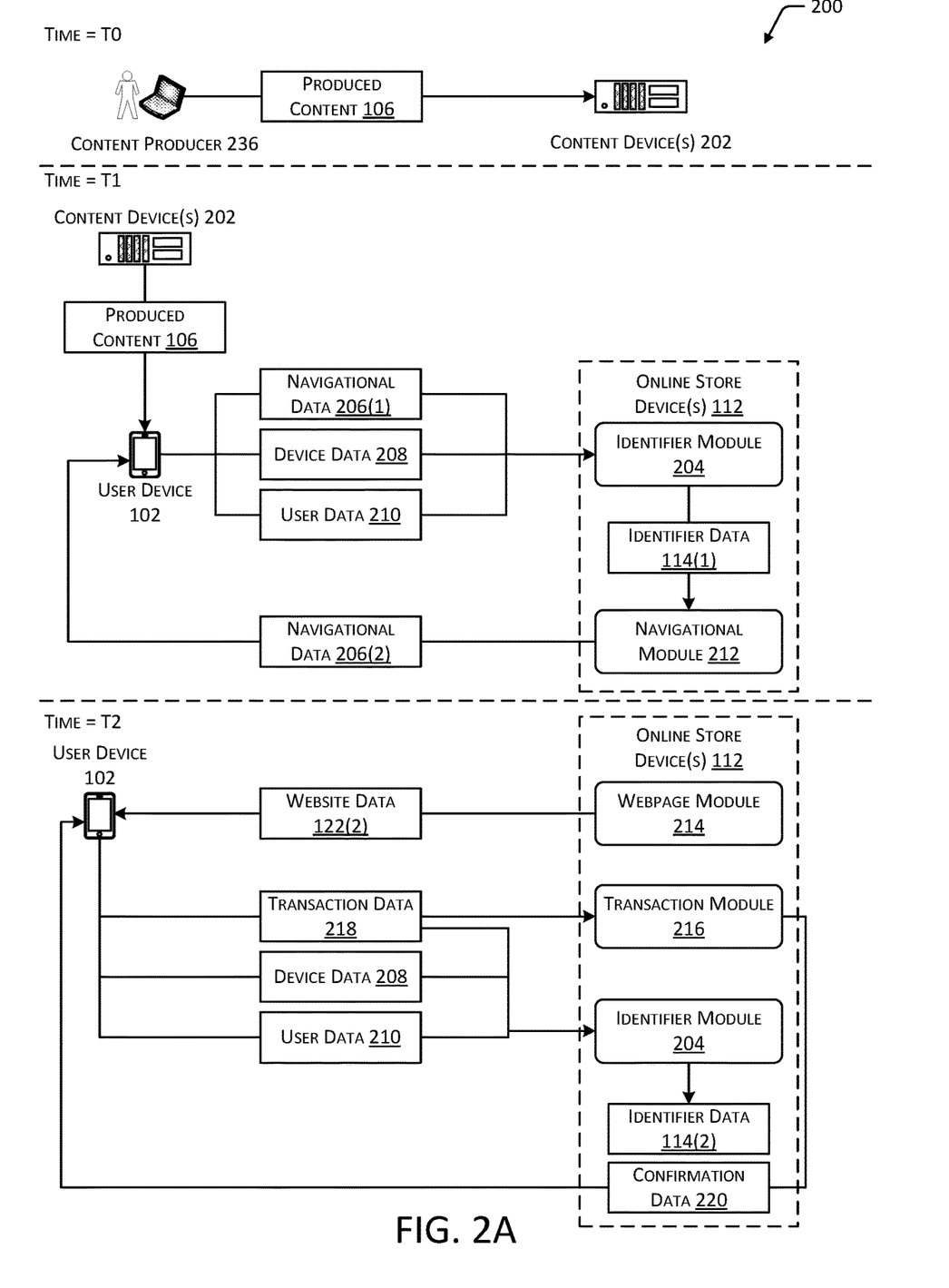
FIGS. 2A and 2B are diagrams depicting an implementation of a system for attributing a transaction associated with a second website to content that caused a user device to access a first website.
Figure 2B:
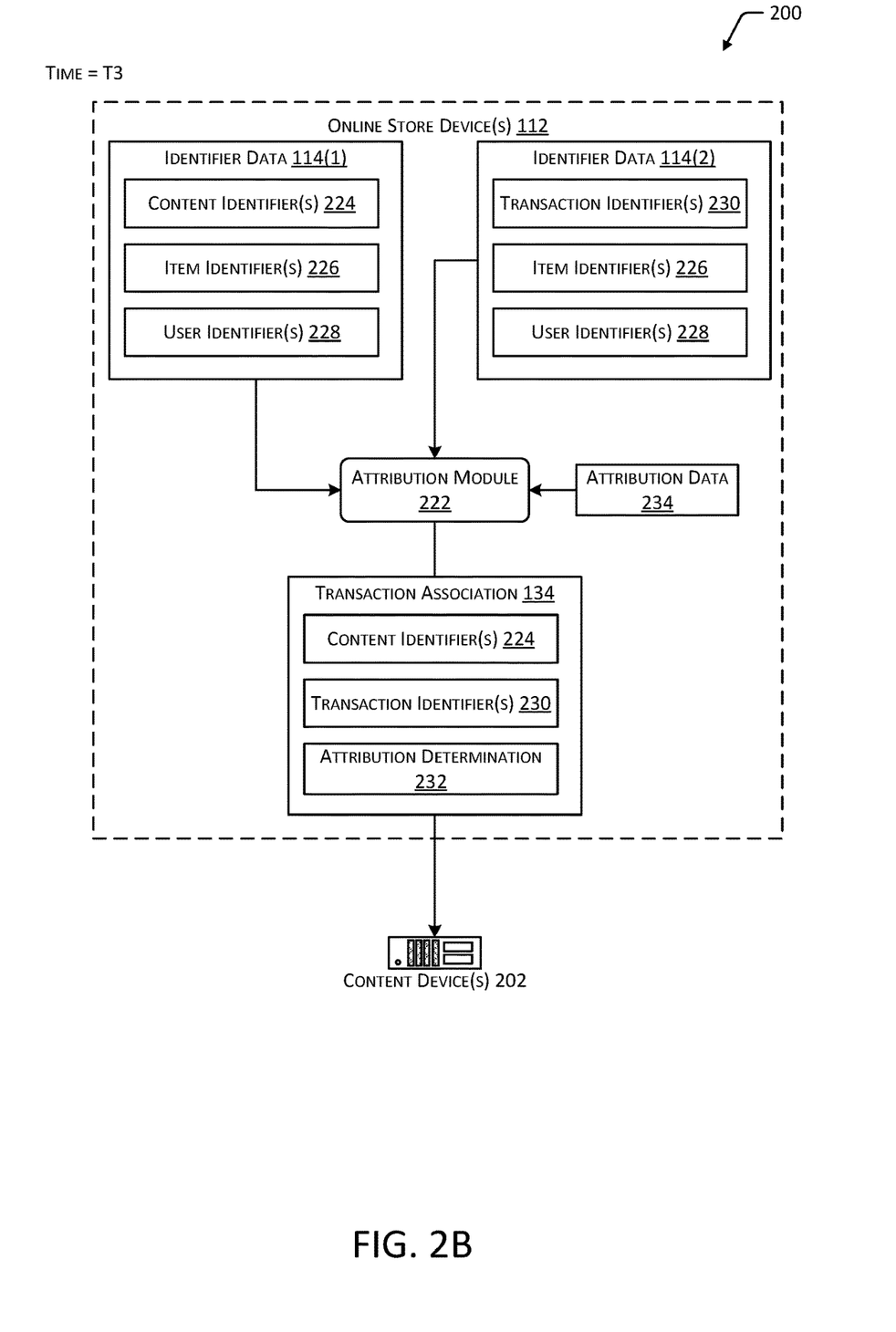

FIGS. 2A and 2B are diagrams 200 depicting an implementation of a system for attributing a transaction associated with a second website to content that caused a user device 102 to access a first website. At an initial time T0, a content producer 236 may generate produced content 106 using one or more computing devices. Produced content 106 may include text, images, video, audio, or other types of data. Additionally, in some cases, produced content 106 may include copies of or links to existing content. While FIG. 2A depicts the content producer 236 as a human user accessing a personal computing device, in other implementations, the content producer 236 may include one or more computing devices that may generate produced content 106 at least partially automatically, such as by determining existing content relevant to an item and generating produced content 106 that includes copies of or links to the existing content. The produced content 106 may be provided to one or more content devices 202 that are accessible to a user device 102. While FIG. 2A depicts the content device(s) 202 as a server, the content device(s) 202 may include any number and any type of computing device(s) including, without limitation, the types of computing devices described with regard to the user device 102, online store device(s) 112, and seller device(s) 120.

At a first time T1, a user device 102 may access produced content 106 associated with one or more content devices 202. Produced content 106 may include one or more of text, images, video data, audio data, or other types of data associated with an item or group of items (such as items associated with a brand, seller, or other characteristic). For example, the produced content 106 may include a blog, video, review, audio recording, or other type of content that may describe one or more characteristics of an item, characteristics of a seller of the item, and so forth, or a copy of or link to access existing content that is associated with the item.

The produced content 106 may include one or more links or other types of controls that may be used to initiate a transaction associated with the item or access a merchant webpage 118 that includes information regarding the item and one or more controls for initiating a transaction associated with the item. As described with regard to FIG. 1A, in response to selection of the link, the user device 102 may be initially caused to exchange data with one or more online store devices 112. For example, a link included in the produced content 106 may include a URI to cause the user device 102 to access a website associated with an online store. In response to selection of the link, an identifier module 204 associated with the online store device(s) 112 may determine data based on one or more of the produced content 106, the link or other control that was selected, the user device 102, or in some cases a user account associated with the user device 102.

For example, the identifier module 204 may determine navigational data 206(1) indicative of a URI or other characteristics of the link or control that was selected. Continuing the example, the URI may include one or more identifiers indicative of the produced content 106, a content producer 236 associated with the produced content 106, the item, or the seller or merchant website associated with the item. The identifier module 204 may determine the identifiers included within the URI or other elements of the link or control. In some implementations, the identifier module 204 may determine device data 208 indicative of one or more characteristics of the user device 102, such as one or more hardware components of the user device 102, one or more software components such as a browser application or other application executed by the user device 102, one or more network addresses associated with the user device 102, and so forth. In some cases, the identifier module 204 may determine user data 210 indicative of a user account associated with the user device 102. For example, if a user has previously associated the user device 102 with a user account for an online store, the online store device(s) 112 may determine data indicative of a user account that corresponds to the user device 102. The identifier module 204 may determine identifier data 114(1) based on one or more of the navigational data 206(1), device data 208, user data 210, or other data determined based on the user device 102, produced content 106, or content device(s) 202. After determining the identifier data 114(1), a navigational module 212 associated with the online store device(s) 112 may provide navigational data 206(2) to the user device 102 to cause the user device 102 to access the merchant website associated with the produced content 106.

At a second time T2 after the first time T1, the user device 102 may access an online store website associated with the online store device(s) 112. For example, in response to a request from the user device 102, a webpage module 214 associated with the online store device(s) 112 may provide website data 122(2) indicative of an online store webpage 128 to the user device 102. As described with regard to FIG. 1B, the online store webpage 128 may present data associated with an item and may include one or more controls to initiate a transaction for the item. A transaction module 216 associated with the online store device(s) 112 may determine transaction data 218 indicative of the transaction. For example, the transaction data 218 may include one or more identifiers indicative of the item, the user device 102 or user account, one or more payment or shipping characteristics associated with the user device 102 or user account or input by a user, and so forth. Based on the transaction data 218, the transaction module 216 may cause order data to be generated, which may cause delivery of one or more items to a location associated with the user device 102 or user account. Delivery of items may include shipment of physical items via one or more carriers, electronic delivery of digital items, processing of rental, lease, or subscription agreements, and so forth. The transaction module 216 may also cause confirmation data 220 indicative of the transaction to be provided to the user device 102.

In response to the transaction, the identifier module 204 may determine identifier data 114(2) based on at least a portion of the transaction data 218. In some implementations, the identifier module 204 may determine at least a portion of the identifier data 114(2) based on one or more of device data 208 or user data 210, which may be determined based on access by the user device 102 to the online store website. For example, the identifier data 114(2) may include one or more identifiers indicative of the item associated with the transaction, one or more identifiers associated with the seller or merchant webpage 118, one or more identifiers indicative of the transaction, one or more identifiers associated with the user device 102 or with a user account associated with the user device 102, and so forth.

As shown in FIG. 2B, at a third time T3 after the second time T2, an attribution module 222 associated with the online store device(s) 112 may determine correspondence between the identifier data 114(1) determined at the first time T1 when the produced content 106 was accessed by the user device 102, and the identifier data 114(2) determined at the second time T2 when a transaction was initiated using the online store webpage 128. As described previously, the first identifier data 114(1) may include one or more content identifiers 224 indicative of the produced content 106 that was accessed by the user device 102. A content identifier 224 may include a name, number, alphanumeric string, or other type of data that is associated with the produced content 106 to enable the produced content 106 to be differentiated from other content. In some cases, a URI, title, or other portion of the produced content 106 may also function as a content identifier 224 for the produced content 106. In some implementations, the first identifier data 114(1) may include an identifier that is indicative of a content producer 236 in addition to or in place of a content identifier 224 indicative of the produced content 106.

The first identifier data 114(1) may also include one or more item identifiers 226 indicative of the item for which information is presented in the produced content 106 and in the merchant webpage 118 that is accessible using a link or other control in the produced content 106. An item identifier 226 may include a stock keeping unit (SKU) or other type of identifier, an item name, title, and so forth. In some implementations, one or more item identifiers 226 indicative of a merchant webpage 118, merchant website, or one or more seller devices 120 may be determined and included in the first identifier data 114(1). For example, a URI or other identifier associated with a merchant webpage 118 may be included in the first identifier data 114(1). In some implementations, the first identifier data 114(1) may include an identifier that is indicative of a seller, merchant website, or merchant webpage 118 in addition to or in place of the item identifier(s) 226.

The first identifier data 114(1) may additionally include one or more user identifiers 228, which may be indicative of a user device 102 that accessed the produced content 106, one or more characteristics or components of the user device 102, or a user account associated with the user device 102. For example, a device name, network address, or other similar information may be used to differentiate a user device 102 from other computing devices. As another example, data indicative of one or more hardware or software components of the user device 102, such as a browser application, may be used as a user identifier 228. In some cases, when the first identifier data 114(1) is determined, data may be stored on the user device 102 by one or more of the online store device(s) 112 or the seller device(s) 120. For example, a cookie or other type of data that may be used to identify the user device 102 at a subsequent time may be provided to the user device 102 when the link or other control associated with the produced content 106 is selected. In some implementations, a user account associated with a user device 102 may be determined when the link or other control associated with the produced content 106 is selected. For example, a user device 102 may have previously been associated with or used to access a user account, and in response to determining the user device 102, data indicative of the user account maybe used as a user identifier 228.

The second identifier data 114(2) may include one or more transaction identifiers 230 indicative of the transaction initiated using the online store webpage 128. For example, the transaction module 216 may assign a transaction identifier 230 when the transaction is initiated. In other cases, data indicative of the item, user device 102, user account, a timestamp, and so forth may be used as a transaction identifier 230. The second identifier data 114(2) may also include one or more item identifiers 226 and user identifiers 228. In cases where a user has previously accessed a merchant website using produced content 106, then subsequently accesses an online store to initiate a transaction for the item offered using the merchant website, one or more of the item identifier(s) 226 or user identifier(s) 228 of the second identifier data 114(2) may be identical to those determined in the first identifier data 114(1).

The attribution module 222 may determine correspondence between the first identifier data 114(1) and the second identifier data 114(2). The correspondence may indicate that one or more item identifiers 226, user identifiers 228, and in some cases other determined data, matches or is similar within a threshold level of similarity. In such a case, the correspondence may indicate that the same user, user account, or user device 102 that previously accessed a merchant website by selecting a link or control included in produced content 106 subsequently initiated a transaction for the item using a separate website, such as an online store website. In such a case, it may be inferred that the produced content 106 was responsible, at least in part, for causing the user to initiate the transaction for the item. Therefore, the attribution module 222 may determine a transaction association 134 between the produced content 106 and the transaction. Specifically, the transaction module 216 may associate one or more content identifiers 224 indicative of the produced content 106 with one or more transaction identifiers 230 indicative of the transaction. In some implementations, the item identifiers 226 in the first identifier data 114(1) and the second identifier data 114(2) may be associated with different items that share a relationship, are complementary to one another, and so forth. For example, a user that accesses information regarding a first item presented in produced content 106 may subsequently purchase a second item that is related to the first item from an online store website. Continuing the example, a user may purchase a variant of the initial item that is offered by the same seller. In such a case, based on the relationship between the initial item and the purchased item, correspondence between the item identifiers 226 may be determined and indicated in the transaction association 134.

In some implementations, the transaction association 134 may also include an attribution determination 232, which may indicate a commission rate, commission value, or other type of incentive or remuneration associated with a content producer 236, or other characteristics of an engagement between the content producer 236 and one or more of a seller or an online store. For example, the attribution module 222 may access attribution data 234 that may indicate characteristics of an engagement, such as an attribution time period, a commission rate, or other incentives or remunerations. Continuing the example, if a transaction occurs within a threshold length of time (e.g., an attribution time period) after a user accessed a link or other control presented in produced content 106, one or more incentives, such a commission rate based on a price, revenue amount, or profit amount associated with the transaction, may be determined to be applicable to the transaction. In some implementations, data indicative of the transaction association 134 may be provided to one or more content devices 202, or another computing device associated with the content producer 236. In some cases, data indicative of the transaction association 134 may be provided to one or more seller devices 120 or another computing device associated with the seller.

Figure 3:
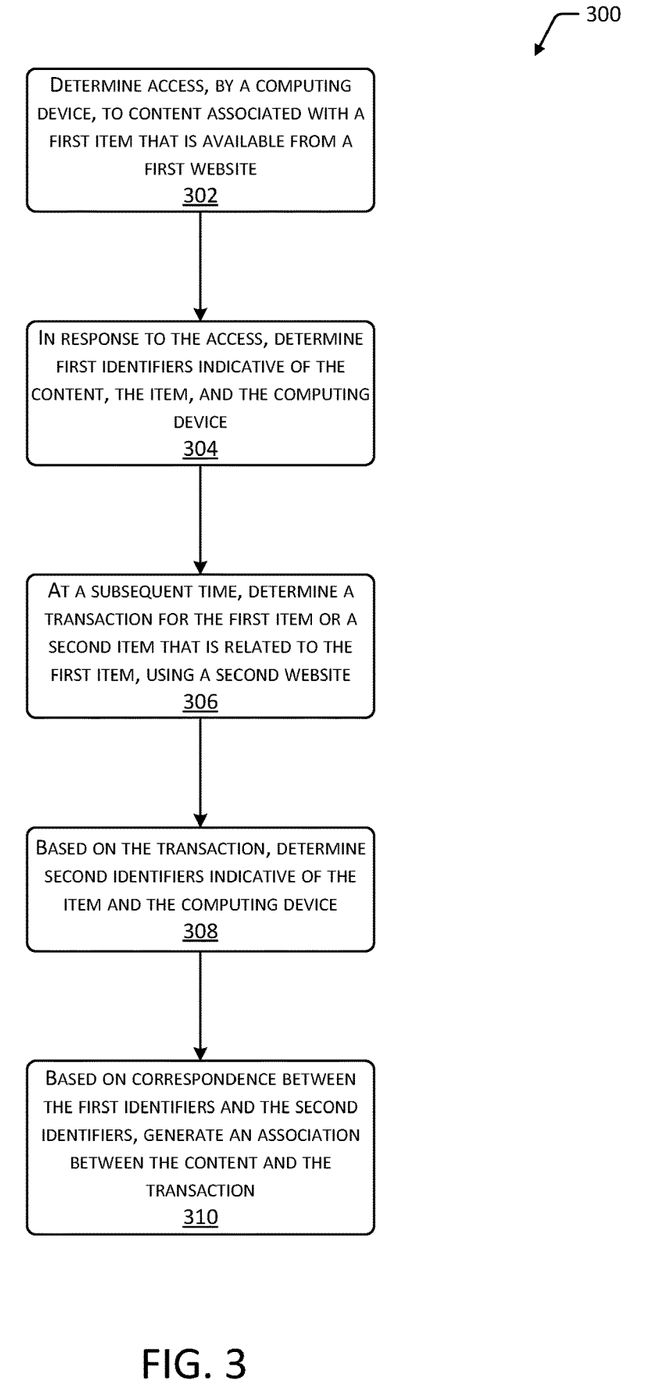
FIG. 3 is a flow diagram depicting an implementation of a method for determining an association between a transaction for an item using a second website and content associated with the item that previously caused a user device to access a first website.

FIG. 3 is a flow diagram 300 depicting an implementation of a method for determining an association between a transaction for an item using a second website and content associated with the item that previously caused a user device to access a first website. At block 302, access may be determined, by a computing device, to content associated with a first item that is available from a first website. For example, a user device 102 may access content associated with a content producer 236, which may include information regarding an item that is available from a merchant website. The produced content 106 may be presented within a webpage, on a separate website, or using one or more other types of interfaces. For example, produced content 106 may include audio data, video data, text, and so forth, which may be presented using various types of interfaces based on the types of data included within the produced content 106. In some implementations, data regarding access by a user device 102 to the produced content 106 may be determined at or near the time that the access occurs. For example, a network address or other type of device identifier indicative of the user device 102 may be determined. In cases where a user account is associated with the user device 102 data indicative of the user account may be determined.

At block 304, in response to the access, first identifiers indicative of the content, the item, and the computing device may be determined. For example, as described with regard to FIGS. 2A and 2B, a user device 102 may access a link or other control within the produced content 106, and a URI associated with the link may be used to access one or more online store devices 112. The URI may include one or more identifiers indicative of the produced content 106, the content producer 236, the item, or the merchant website within the URI. In some implementations, identifiers indicative of the content producer 236 or seller of the item may be determined in addition to or in place of identifiers indicative of the content or the item. In some cases, one or more content identifiers 224, item identifiers 226, or one or more identifiers indicative of the content producer 236, merchant, or merchant website may be determined from one or more content devices 202 or seller devices 120, which may provide data indicative of access by the user device 102. Additionally, in some cases, data that may be used to identify the user device 102 or user account may be determined, such as by determining one or more hardware of software components of the user device 102, a network address, and so forth.

At block 306, at a subsequent time, a transaction for the first item, or a second item that is related to the first item, may be determined. The transaction may be initiated by the computing device, using a second website. For example, a user device 102 may initially be directed to access a merchant website using a link or other control associated with produced content 106. The user device 102 may not necessarily be used to initiate a transaction for the item at the time that the merchant website is accessed. At a subsequent time, the user device 102, or another computing device associated with a user account that is associated with the user device 102, may be used to access an online store (e.g., a different website) to initiate a transaction for the item. In some cases, the transaction initiated using the second website may be associated with the same item described in the produced content 106. In other cases, the transaction may be associated with a different item having a relationship with the initial item, such as a variant of the initial item available from the same brand, seller, or manufacturer.

At block 308, based on the transaction, second identifiers indicative of the item and the computing device may be determined. For example, to initiate a transaction for the item, data may be acquired from a user device 102, such as data to authenticate access to a user account or create a new user account, data indicative of shipping and payment characteristics, a location associated with the user or user device 102, and so forth. Order data, confirmation data 220, or other data generated based on the transaction may include one or more identifiers indicative of the item, the user account, user device 102, and so forth. In cases where the same user, user account, or user device 102 that previously accessed a merchant webpage 118 associated with an item using a link or other control in the produced content 106, also initiated a transaction for the same item or a related item at a subsequent time using a second website, at least a subset of the first identifiers may correspond with at least a subset of the second identifiers within a threshold correspondence.

Therefore, at block 310, based on correspondence between the first identifiers and the second identifiers, an association between the content and the transaction may be generated. An association between produced content 106 or an associated content producer 236 and a transaction may cause the transaction to be attributed to the content producer 236 or to the content. In such a case, the content producer 236 may receive a commission or other incentive. For example, if a purchase of an item occurs within a threshold length of time, such as an attribution time period, after a user has accessed a merchant webpage 118 using a link included in the produced content 106, a content producer 236 associated with the produced content 106 may receive a commission based on a commission rate and a portion of the sale price, revenue amount, or profit amount associated with the transaction.

Associations between produced content 106 and transactions may also be used for other purposes, such as generation of output data for presentation to sellers, content producers 236, users associated with an online store, and so forth. For example, a seller may be provided with output indicative of counts or values of transactions that may be attributed to particular produced content 106 or particular content producers 236. A seller may also be provided with counts or values of transactions associated with different websites, such as a first count of transactions for an item that were initiated using the merchant website after navigating to the merchant website using content from a content producer 236, and a second count of transactions for the item that were initiated using the online store after previously accessing the merchant website using the content from the content producer 236. In some implementations, the output data may be determined based in part on transaction history data associated with users. For example, an output may indicate whether a user has previously purchased items associated with a particular brand, seller, or manufacturer, items of a certain type or category, and so forth.

Figure 4:
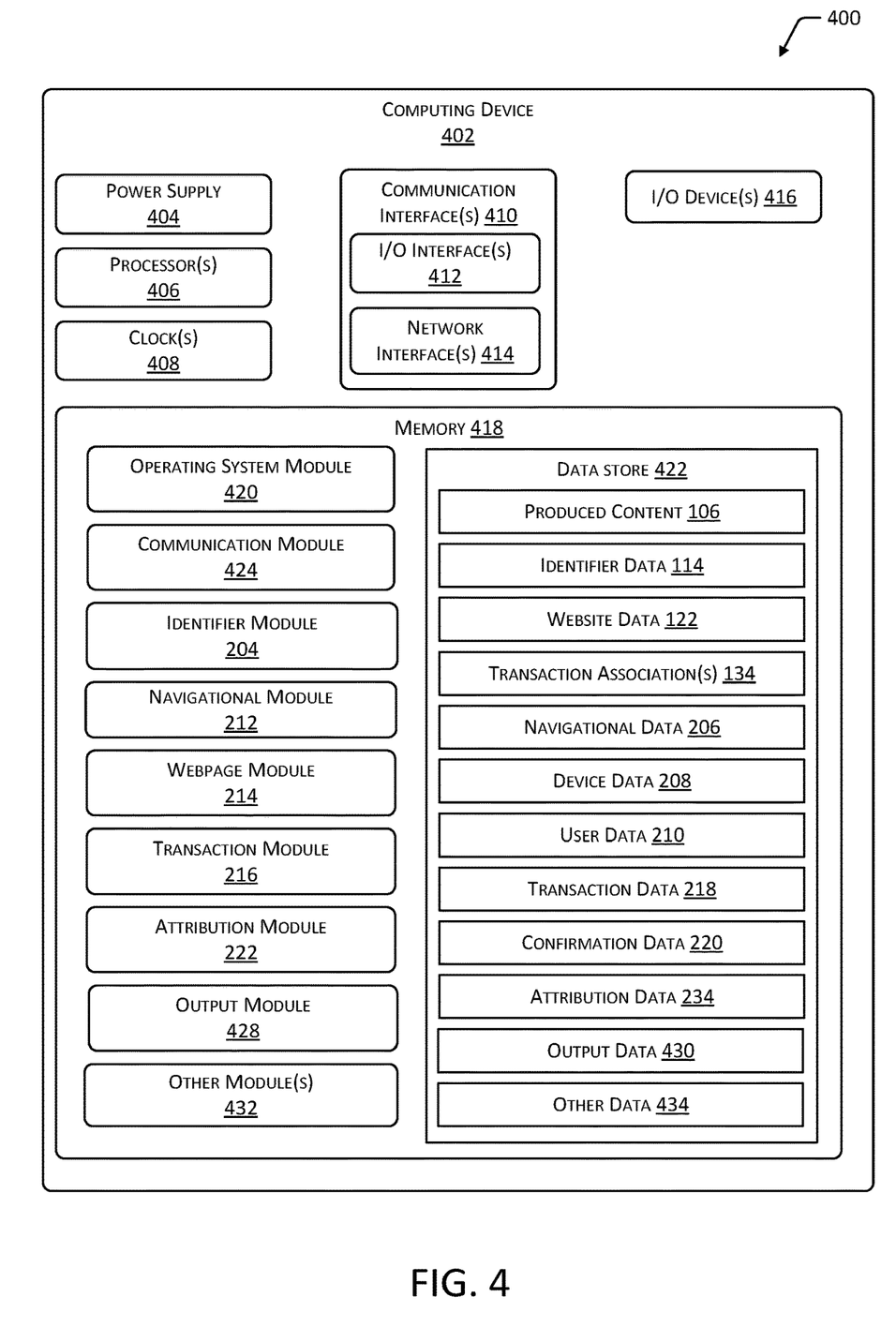
FIG. 4 is a block diagram depicting an implementation of a computing device within the present disclosure.

FIG. 4 is a block diagram 400 depicting an implementation of a computing device 402 within the present disclosure. In some implementations, the computing device 402 may include one or more online store devices 112, as shown in FIG. 1A. In other implementations, the computing device 402 may include one or more seller devices 120, user devices 102, or content devices 202. For example, any of the functions described with regard to the online store device(s) 112 may be performed by other computing devices 402. Any combination of online store devices 112, seller devices 120, user devices 102, content devices 202, or other computing devices 402 in communication with an online store device 112 may be used to perform the functions described herein. Therefore, while FIG. 4 depicts a single block diagram 400 of a computing device 402, any number and any type of computing devices 402 may be used to perform the functions described herein.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth. Continuing the example, data from the clock(s) 408 may be used to determine times when user interactions occur, which may be used to determine whether a transaction occurred within a threshold length of time after accessing content, such as within an attribution time period.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 414 may include devices compatible with Ethernet, Wi-Fi, Bluetooth, ZigBee, Z-Wave, 3G, 4G, 5G, LTE, and so forth.

The computing device 402 may include one or more buses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices 402, network attached storage devices, and so forth.

A communication module 424 may be configured to establish communications with one or more other computing devices 402. Communications may be authenticated, encrypted, and so forth.

The memory 418 may also store the identifier module 204. The identifier module 204 may determine identifier data 114 based a link or other control that is selected within produced content 106, a computing device 402 accessing the produced content 106, a user account associated with the user device 102, and so forth. For example, the identifier module 204 may determine the identifiers included within a link or control within produced content 106. In some implementations, the identifier module 204 may determine device data 208 indicative of one or more characteristics of a computing device 402 accessing the produced content 106, such as hardware or software components, network addresses, and so forth. In some cases, the identifier module 204 may determine user data 210 indicative of a user account associated a computing device 402 accessing content.

The memory 418 may additionally store the navigational module 212. The navigational module 212 may provide website data 122, such as links or URIs, that may be used to access selected websites, to other computing devices 402. For example, after determining identifier data 114 based on access by a computing device 402 to produced content 106, the navigational module 212 may redirect a browser application associated with the computing device 402 to a merchant website or other website. A navigational module 212 associated with the online store device(s) 112 may provide navigational data 206(2) to the user device 102 to cause the user device 102 to access the merchant website associated with the produced content 106.

The memory 418 may store the webpage module 214. The webpage module 214 may provide website data 122 indicative of an online store webpage 128 to computing devices 402 that provide a request to access the online store webpage 128. For example, after accessing a merchant website, a user may navigate to an online store to determine additional information regarding an item described in the merchant website.

The memory 418 may also store the transaction module 216. The transaction module 216 may receive input to initiate a transaction, and determine transaction data 218 indicative of the transaction. The transaction data 218 may include one or more identifiers indicative of the item associated with the transaction, the computing device 402 or user account initiating the transaction, one or more payment or shipping characteristics input by a user or associated with a user account, and so forth. Based on the transaction data 218, the transaction module 216 may cause order data to be generated, which may cause delivery of one or more items.

The memory 418 may additionally store the attribution module 222. The attribution module 222 may determine correspondence between the identifier data 114 determined based on access to produced content 106 at a first time, and identifier data 114 determined based on a transaction that occurs at a second time. For example, identifier data 114 may include content identifiers 224 indicative of the produced content 106 that was accessed by a computing device 402, transaction identifiers 230 indicative of an initiated transaction, item identifiers 226, and user identifiers 228. In cases where a user has previously accessed a merchant website using produced content 106, then subsequently accesses an online store to initiate a transaction for the item offered using the merchant website, one or more of the item identifier(s) 226 and user identifier(s) 228 of the second identifier data 114(2) may be identical to those determined in the first identifier data 114(1). The attribution module 222 may determine correspondence between identifier data 114 determined based on access to produced content 106 and identifier data 114 associated with a transaction from a separate website. In such a case, it may be inferred that the produced content 106 was responsible, at least in part, for causing a user to initiate the transaction for an item. Therefore, the attribution module 222 may determine a transaction association 134 between the produced content 106 and the transaction. In some implementations, the attribution module 222 may also cause transfer of one or more commissions, incentives, or other types of remuneration to content producers 236 in response to transaction associations 134 that attribute particular transactions to particular content producers 236.

The memory 418 may also store an output module 428. The output module 428 may generate output data 430 based on one or more transactions that are associated with an item, a merchant website, a seller, and so forth. For example, a seller may be provided with output data 430 indicative of counts or values of transactions that may be attributed to particular produced content 106 or particular content producers 236. A seller may also be provided with counts or values of transactions associated with different websites, such as a first count of transactions for an item that were initiated using the merchant website after navigating to the merchant website using content from a content producer 236, and a second count of transactions for the item that were initiated using the online store after previously accessing the merchant website using the content from the content producer 236. In some implementations, the output data may be determined based in part on transaction history data associated with users. For example, an output may indicate whether a user has previously purchased items associated with a particular brand, seller, or manufacturer.

Other modules 432 may also be present in the memory 418. For example, other modules 432 may include permission modules to enable users to access and modify data associated with the computing device 402. Other modules 432 may include authorization modules to enable a user to opt in or otherwise provide authorization for data associated with a user device 102, content device 202, seller device 120, or other computing device 402 to be acquired, processed, and used to determine transaction associations 134. Other modules 432 may also include encryption modules to encrypt and decrypt communications between computing devices 402, authentication modules to authenticate communications sent or received by computing devices 402, user interface modules to generate interfaces for receiving input from users, and so forth.

Other data 434 within the data store(s) 422 may include configurations, settings, preferences, and default values associated with computing devices 402. Other data 434 may also include encryption keys and schema, access credentials, and so forth.

In different implementations, different computing devices 402 may have different capabilities or capacities. For example, online store devices 112, such as servers, may have greater processing capabilities or data storage capacity than a typical user device 102.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
provide, to a user device, a first webpage that is associated with a content producer, wherein the first webpage includes:
a navigational link indicative of a second webpage associated with a first seller of an item; and
first information regarding the item;
at a first time, determine input indicative of selection of the navigational link by the user device;
in response to the input selecting the navigational link that indicates the second webpage associated with the first seller: automatically and without user input, direct the user device to a linked interface associated with a second seller of the item;
in response to access by the user device to the linked interface, use a computing device associated with the linked interface to acquire first data from the user device, wherein the first data includes:
a first identifier indicative of the content producer;
a second identifier indicative of the item;

a third identifier indicative of the first seller; and merchant website; and a fourth identifier indicative of the user device;

after the first data is acquired, automatically and without user input, redirect the user device from the linked interface to access the second webpage associated with the first seller, wherein the second webpage offers the item for purchase;

at a second time after the first time, determine access by the user device to a third webpage associated with the second seller, wherein the third webpage includes second information regarding the item and offers the item for purchase;

determine a purchase transaction for the item associated with the user device and the third webpage associated with the second seller;

determine second data based on the access by the user device to the third webpage, wherein the second data includes:

the second identifier indicative of the item; and
the fourth identifier indicative of the user device; and in response to correspondence between the second data and the first data, generate third data indicative of an association between:

the purchase transaction associated with the third webpage and the second seller; and
the content producer associated with the first identifier and the first webpage.

2. The system of claim 1, further comprising computer-executable instructions to:

in response to the access by the user device to the linked interface, provide fourth data to the user device, wherein the fourth data is indicative of one or more of: the first identifier, the second identifier, or the third identifier; and in response to the purchase transaction, determine correspondence between the fourth data and the first data, wherein the third data is further generated in response to the correspondence between the fourth data and the first data.

3. The system of claim 1, further comprising computer-executable instructions to:

determine a threshold length of time associated with the content producer, wherein the threshold length of time is indicative of time between the selection of the navigational link and initiation of the purchase transaction for the item; and determine that a length of time between the first time and the purchase transaction is less than the threshold length of time;

wherein the third data is further generated in response to the length of time being less than the threshold length of time.

4. A method comprising:

at a first time, determining selection by a first computing device of a navigational link indicative of a first website that is associated with content indicative of a first item, wherein the first item is available for a transaction using the first website associated with a first seller of the first item, and wherein in response to the selection of the navigational link by the first computing device, the first computing device is automatically directed to a linked interface associated with a second seller of the first item;

in response to access by the first computing device to the linked interface, determining, by a second computing device associated with the second seller of the first item, first data that includes:

a first identifier indicative of one or more of the content or a content producer associated with the content;

a second identifier indicative of one or more of the first item, the first website, or the first seller; and a third identifier indicative of one or more of the first computing device or a user account associated with the first computing device;

after determining the first data, automatically redirecting the first computing device to the first website associated with the first seller;

at a second time after the first time, determining a first transaction for one or more of the first item or a second item that is related to the first item, wherein the first transaction is initiated using a second website associated with the second seller, and wherein the first transaction is associated with the one or more of the first computing device or the user account associated with the first computing device;

based on the first transaction associated with the one or more of the first computing device or the user account associated with the first computing device, determining second data that includes the third identifier; and in response to correspondence between the first data and the second data, generating third data indicative of an association between:

the first transaction associated with the second website and the second seller; and the one or more of the content or the content producer associated with the navigational link indicative of the first website.

5. The method of claim 4, wherein the first transaction is associated with the second item that is related to the first item, the method further comprising:

determining a relationship between the first item and the second item, wherein the association between the first transaction and the one or more of the content or the content producer is generated based in part on the relationship; and generating an indication of one or more of the relationship or a characteristic of the second item.

6. The method of claim 4, further comprising:

at a third time before the second time, determining user data associated with access by the first computing device to the first website; and at a fourth time after the second time, based on the first transaction and access by the first computing device to the second website, determining at least a portion of the user data;

wherein the third data is further generated in response to correspondence between the user data determined at the third time and the at least a portion of the user data determined at the fourth time.

7. The method of claim 4, further comprising:

at a third time before the second time, in response to the access by the first computing device to the linked interface, providing to the first computing device fourth data indicative of the access; and at a fourth time after the second time, in response to the first transaction, determining at least a portion of the fourth data stored in association with the first computing device;

wherein the third data is further generated in response to the at least a portion of the fourth data stored in association with the first computing device.

8. The method of claim 4, wherein the first website causes fourth data indicative of the access by the first computing device to the linked interface to be provided to the first computing device, the method further comprising:
in response to the first transaction, determining at least a portion of the fourth data stored in association with the first computing device;
wherein the third data is further generated in response to the at least a portion of the fourth data stored in association with the first computing device.

9. The method of claim 4, further comprising:
determining a commission rate associated with one or more of: the first item, the second item, the content, the content producer, the first seller, the second seller, or the first website;
determining item data indicative of one or more characteristics of the one or more of the first item or the second item;
determining a commission value based on the commission rate and the item data; and
including an indication of the commission value in the third data.

10. The method of claim 4, further comprising:
determining that a length of time between the first time and the second time is less than a threshold length of time associated with the content;
wherein the third data is further generated in response to the length of time being less than the threshold length of time.

11. The method of claim 4, wherein the first transaction is associated with the first item, the method further comprising:
at a third time after the first time, determining a second transaction for the second item using one or more of the first website or the second website, wherein the second transaction is associated with the one or more of the first computing device or the user account associated with the first computing device;
determining a relationship between the second item and the first item; and
based on the relationship, generating fourth data indicative of an association between the second transaction and the content.

12. The method of claim 11, further comprising:
determining that a length of time between the first time and the third time is less than a threshold length of time associated with the content;
wherein the fourth data is further generated in response to the length of time being less than the threshold length of time.

13. The method of claim 4, further comprising:
determining output data based in part on the third data and the first transaction, wherein the output data indicates a first count of transactions for the one or more of the first item or the second item associated with the first website, and a second count of transactions for the one or more of the first item or the second item associated with the second website; and
providing at least a portion of the output data to a third computing device associated with the first website.

14. The method of claim 4, further comprising:
determining transaction history data associated with the second website, wherein the transaction history data indicates one or more previous transactions associated with the one or more of the first computing device or the user account associated with the first computing device;
determining correspondence between the first transaction and the transaction history data;
determining output data based at least in part on the correspondence between the first transaction and the transaction history data; and
providing at least a portion of the output data to a third computing device associated with the first website.

15. A system comprising:
one or more memories storing computer-executable instructions; and
one or more hardware processors to execute the computer-executable instructions to:
at a first time, determine selection by a first computing device of a navigational link indicative of a first website that is associated with content indicative of a first item, wherein the first item is available for a transaction using the first website associated with a first seller of the first item, and wherein in response to the selection of the navigational link by the first computing device, the first computing device is automatically directed to a linked interface associated with a second seller of the first item;
in response to access by the first computing device to the linked interface, determine, using a second computing device associated with the second seller of the first item, first data indicative of:
one or more of the content, a content producer associated with the content, the first item, the first seller associated with the first item, or the first website; and
one or more of the first computing device or a user account associated with the first computing device;
after determining the first data, automatically redirect the first computing device to the first website associated with the first seller;
at a second time after the first time, determine a first transaction associated with the one or more of the first computing device or the user account associated with the first computing device, wherein the first transaction is associated with the second seller of the first item;
based on the first transaction, determine second data indicative of the one or more of the first computing device or the user account associated with the first computing device; and
in response to correspondence between the first data and the second data, generate third data indicative of an association between:
the first transaction associated with the second seller of the first item; and
one or more of the content associated with the navigational link associated with the first website or the content producer associated with the content.

16. The system of claim 15, wherein the first transaction is associated with the first item, the system further comprising computer-executable instructions to:
determine that a length of time between the access by the first computing device to the linked interface and the first transaction associated with the first item is less than a threshold length of time;
wherein the third data is further generated in response to the length of time being less than the threshold length of time.

17. The system of claim 15, wherein the first transaction is associated with a second item, the system further comprising computer-executable instructions to:
  determine a relationship between the first item and the second item;
  wherein the third data is further generated in response to the relationship between the first item and the second item.

18. The system of claim 17, further comprising computer-executable instructions to:
  determine that a length of time between the access by the first computing device to the linked interface and the first transaction associated with the second item is less than a threshold length of time;
  wherein the third data is further generated in response to the length of time being less than the threshold length of time.

19. The system of claim 15, further comprising computer-executable instructions to:
  determine transaction history data associated with the one or more of the first computing device or the user account associated with the first computing device, wherein the transaction history data is indicative of one or more previous transactions;
  generate output data based on correspondence between the transaction history data and the first transaction; and
  provide the output data to a third computing device associated with the first website.

20. The system of claim 15, further comprising computer-executable instructions to:
  determine fourth data stored in association with the first computing device by one or more of the second computing device or a third computing device associated with the first website; and
  determine correspondence between the first data and the fourth data, wherein the third data is further generated in response to the correspondence between the fourth data and the first data.

* * * * *

UNITED STATES PATENT AND TRADEMARK OFFICE
CERTIFICATE OF CORRECTION

PATENT NO.           : 11,915,286 B1                         Page 1 of 1
APPLICATION NO.      : 17/546935
DATED                : February 27, 2024
INVENTOR(S)          : Venkatraman Prabhu et al.

It is certified that error appears in the above-identified patent and that said Letters Patent is hereby corrected as shown below:

In the Claims

Column 19, Claim 1, Line 2:
Currently reads: "merchant website; and" this text should have been deleted.

Signed and Sealed this
Second Day of April, 2024

Katherine Kelly Vidal
*Director of the United States Patent and Trademark Office*